Dec. 12, 1933.  E. C. LOETSCHER  1,938,917

INSULATING MATERIAL AND PROCESS FOR MAKING THE SAME

Filed March 3, 1930

Inventor,
Emil C. Loetscher,

Witness:

Patented Dec. 12, 1933

1,938,917

UNITED STATES PATENT OFFICE 1,938,917

INSULATING MATERIAL AND PROCESS FOR MAKING THE SAME

Emil C. Loetscher, Dubuque, Iowa

Application March 3, 1930. Serial No. 432,722

1 Claim. (Cl. 154—2.6)

This invention relates to improvements in insulating materials for electrical and other uses, and particularly to a composite or laminated material, of which layers of paper impregnated with a resinous substance and a filler of a pulverized cellulose fibrous material are the chief ingredients.

The object of the invention is to provide a relatively cheap substitute for the materials now extensively used for like purposes, namely, vulcanized fiber and phenol condensation products. In referring to insulating materials herein, a distinction is to be made between substances having recognized insulating properties, such as hard rubber, porcelain, and other compounds which are molded or cast into the form of the insulated article, and laminated sheets of fibrous material so treated as to acquire insulating properties, and thus affording a suitable material for use in the manufacture of electrical equipment, heating appliances and a large variety of articles, which by reason of their use are required to be uninflammable and heat-resisting, as for instance ash receivers, waste baskets and the like.

Phenol condensation products have been extensively used for insulated panels being made of many layers of impregnated paper compressed together under high pressure. Such materials provide admirable insulation, but are too expensive for general use, because of the large quantities of the phenol condensation products and the amount of paper used in their manufacture. Vulcanized fiber on the other hand, is considerably cheaper than phenol condensation products, and, therefore, has a wide field for its use, although inferior as an insulating medium.

The purpose of the present invention is to provide a material which is substantially the equivalent of the more costly insulating sheet materials in insulating and heat-resisting properties, but because of its makeup and process of manufacture is available at a cost comparable to that of vulcanized fiber, but superior thereto in every respect.

Figure 1:

The composition of the improved insulating material and the method of its manufacture will now be fully presented in connection with the accompanying drawing in which Figure 1 is a view illustrating the manner in which the several layers composing the material are built up prior to being compressed into a laminated sheet.

Figure 2:

Figure 2 is a view in cross section through the material after it has been compressed.

As shown in Figure 1, the material is composed of a plurality of layers superimposed upon each other, which eventually are compressed into the composite laminated sheet of Figure 2. The base of the material is a plurality of sheets of paper treated with a phenol condensation product or other equivalent resinous substances, with intermediate layers of a fibrous filler such as wood flour. Different grades of paper are used and their preparation varies somewhat, although all have a common characteristic, namely, that they are treated or impregnated with a phenol condensation product and in some instances with a cheaper resinous compound such as a lime treated resin as will later be discussed.

The treatment of the paper is more or less similar in all grades of paper, and consists of feeding the paper through a bath of a phenol condensate or other resinous varnish and then through an oven maintained at a temperature of 110° to 120° centigrade in order to drive off the alcohol solvent, leaving the surfaces in a somewhat tacky condition. For the outer or surface coating a relatively thin alpha cellulose paper is used, and for the inner layers a heavier kraft paper is found to be very satisfactory. The thinner papers naturally absorb a greater volume of the phenol condensation product in proportion to their weight than the thicker paper, and hence are impregnated with from 50% to 60% of the product by weight, while the heavier papers may contain as high as 50%, but usually less of the same.

The number of layers of paper used in making a sheet of the material depends on its final thickness. Thus in Figure 1 the composition of the sheet to be produced calls for five inner or intermediate layers 1 of plain treated kraft paper and two outer or covering layers 2, 2 of the thinner treated paper. These outer layers of paper are usually colored to give the material a distinctive or appropriate tone, as for instance brown or green, and in some cases is printed in imitation of the color graining of some natural wood, such as mahogany or walnut.

Between the layers of paper are layers of filler 3 which, as already indicated, is preferably wood flour, that is, wood reduced to a pulverized state. It is sometimes preferred to mix the wood flour with a phenol condensation product or a natural resin in pulverized form, the mixture being preferably equal parts of wood flour and the resin.

The pulverized filler of wood flour with or without the resin content is preferably introduced into the composite material by coating both surfaces of each alternate inner layer 1 of the treated kraft paper with the filler, although each layer can be coated if desired, where a greater proportion of the filler to the paper is to be used. A convenient method of applying the filler to the paper is to spread the same over the surfaces as it is fed between pressure rolls, which insures the adherence of a uniform coating of the filler to the tacky surface of the paper. Manifestly considerable latitude is permitted with respect to the makeup of the material as regards the proportion of paper, wood flour and the particular phenol condensation product used, this in turn being governed by the use to which the material is to be put. Generally speaking, the greater the proportion of the phenol condensation product, the better the insulating properties but greater the cost, inasmuch as these condensation products are relatively expensive. In this connection, the cost can be considerably reduced by using a natural resin for the impregnation of the inner layers of paper as well as a constituent of the wood flour mixture for the filler, thus limiting the use of the condensation product to the outer layers in order to retain the advantage of its superior heat-resisting qualities at the surfaces of the material. Moreover, where a resin is to be used, the variety known as lime-treated is preferably used on account of its higher melting point and other properties more nearly approaching those of phenol condensation products. Similarly the proportion of wood flour to paper is determinative of the cost, inasmuch as the former is a relatively cheap product compared with paper, and, therefore, is available at a fraction of the cost.

Having assembled the layers of materials in the manner and with the variation in arrangement and proportion heretofore set forth, it is ready for the final operation of compression into a laminated or composite sheet. A hydraulic or other suitable press is used for this purpose, together with special equipment, consisting essentially of hollow platens or die plates with connections for circulating steam and water therethrough. The assembled materials are placed between the platens and preferably separated by pressure plates having highly polished or dull surfaces in contact with the material, depending on the surface finish to be imparted to the material. Pressure is then applied to the material from 500 to 2000 pounds per square inch, depending on the density of the product desired, and then steam is admitted to the platens until the temperature is raised to a point and maintained for a length of time sufficient to cure the phenol condensation product and effect the uniting of the materials into a solid mass. When this has been accomplished, the steam is shut off and the cooling water circulated through the platens until the temperature has been restored to normal, whereupon the finished product is removed.

Where flat sheets are being produced, multiple platens can be used, thus permitting several sheets of the product to be compressed in a single press operation. However, the product may be formed into a variety of shapes other than sheets, by the use of dies, the composition of the materials being such that the several layers are enabled to slide over each other and thus conform readily with the die faces without distortion. It is advisable in this instance to heat the material before pressure is applied, so as to soften the phenol condensation product and thus allow the material to flow more readily.

The resulting product is a hard, dense substance having the appearance as well as the insulating and heat-resisting properties of so-called phenol condensation products, but owing to its composition and more particularly in the replacement of a large proportion of the paper by wood flour, is considerably cheaper to produce and therefore can be used for the making of a great many articles which otherwise would be prohibitive as to cost. Thus in addition to sheets and shapes intended primarily for insulation and protection in electrical appliances, it finds a wide range of uses in the making of table and desk tops, trays, receptacles and like articles which are subject to contact with heated objects, and, therefore, would be marred except for the infusible character of the phenol condensation product. And finally the surface of the material lends itself to artistic decoration in color or natural wood effects, which is not possible with vulcanized fiber, the use of which is comparable as to cost, but confined to the making of articles of comparatively simple shapes and plain undecorated finishes.

Having set forth a preferred composition for the insulating material and method of making the same,

I claim as my invention:

A composite material for the purposes described, composed of a plurality of interior layers of kraft paper impregnated with a phenol condensation product, outer layers of thinner surface paper and layers of a mixture of equal parts of wood flour and resin intermediate the layers of paper, said superimposed layers having been reduced to a dense hard mass by the combined action of heat and pressure.

EMIL C. LOETSCHER.